(12) United States Patent
Kelvin (10) Patent No.: US 10,677,299 B2
(45) Date of Patent: Jun. 9, 2020

(54) CALIPER GUIDE PIN ASSEMBLY

(71) Applicant: John Kelvin, China Township, MI (US)

(72) Inventor: John Kelvin, China Township, MI (US)

(*) Notice: Subject to any disclaimer, the term of this patent is extended or adjusted under 35 U.S.C. 154(b) by 81 days.

(21) Appl. No.: 15/997,081

(22) Filed: Jun. 4, 2018

(65) Prior Publication Data

US 2019/0032733 A1 Jan. 31, 2019

Related U.S. Application Data

(60) Provisional application No. 62/538,913, filed on Jul. 31, 2017.

(51) Int. Cl.
*F16D 55/2265* (2006.01)
*F16D 65/00* (2006.01)
*F16D 55/00* (2006.01)

(52) U.S. Cl.
CPC ....... *F16D 55/22655* (2013.01); *F16D 65/00* (2013.01); *F16D 65/0087* (2013.01); *F16D 65/0093* (2013.01); *F16D 2055/007* (2013.01)

(58) Field of Classification Search
CPC ............... F16D 55/22655; F16D 65/00; F16D 2055/007; F16D 65/0093; F16D 65/0087
USPC ..................... 188/73.44, 73.45, 73.43, 73.31
See application file for complete search history.

(56) References Cited

U.S. PATENT DOCUMENTS

| | | | | |
|---|---|---|---|---|
| 4,313,526 | A * | 2/1982 | Farr | F16D 55/22655 188/72.4 |
| 5,282,521 | A * | 2/1994 | Leist | F16D 55/227 188/73.39 |
| 6,039,156 | A * | 3/2000 | Schneider | F16D 55/22655 188/73.44 |
| 8,051,958 | B1 * | 11/2011 | Rockwell | F16D 55/22655 188/73.45 |
| 2001/0013449 | A1 * | 8/2001 | Fontana | F16D 55/22655 188/73.44 |
| 2006/0049007 | A1 * | 3/2006 | Tomita | F16D 55/00 188/73.31 |
| 2014/0110198 | A1 * | 4/2014 | Becker | F16D 55/22655 188/73.44 |
| 2014/0116817 | A1 * | 5/2014 | Morais | F16D 55/2265 188/73.45 |
| 2017/0114851 | A1 * | 4/2017 | Matsumura | F16D 55/226 |

* cited by examiner

*Primary Examiner* — Pamela Rodriguez (57) ABSTRACT

A caliper guide pin assembly has a tubular guide pin, a cap, a grease valve and a plurality of lubricating grooves; the plurality of lubricating grooves are radially distributed about the tubular guide pin; each of the plurality of lubricating grooves normally traverses into the tubular guide pin from an external surface of the tubular guide pin; each of the plurality of lubricating grooves traverses into the tubular guide pin from a front surface of the tubular guide pin; the cap is concentrically positioned with the tubular guide pin; the cap is positioned about the tubular guide pin, adjacent to the front surface of the tubular guide pin; the grease valve is positioned adjacent to the cap, opposite to the tubular guide pin; the grease valve is adjacently integrated into the cap; the grease valve is in fluid communication with each of the plurality of lubricating grooves.

17 Claims, 7 Drawing Sheets

FIG. 7 ns. No. 62/538,913 filed on
CALIPER GUIDE PIN ASSEMBLY

The current application claims a priority to the U.S. Provisional Patent application Ser. No. 62/538,913 filed on Jul. 31, 2017.

FIELD OF THE INVENTION

The present invention relates generally to brake systems for an automotive vehicle. In particular, the present invention is a caliper guide pin assembly for air disk brakes used by heavy equipment or commercial truck and trailer calipers. The present invention allows more grease to be delivered to a guide pin and bushing of the caliper without parts replacement or complete disassembly.

BACKGROUND OF THE INVENTION

Air disk brakes have been widely adopted in Europe, primarily as result of their performance advantages over conventional drum brakes. These high-performance brakes are now being widely adopted in U.S. commercial vehicles and industry experts predict air disc braking systems will consume 30% of the US commercial vehicle market by 2020. One major problem faced by users of these brake calipers is their inherent ability to seize up and cause brake failure during service. Air disc calipers, like most brake calipers, comprise two-pieces of iron. One piece known as the carrier, saddle, or bracket, and is bolted to the wheel end in a fixed position. For the purposes of this discussion, we shall hereafter refer to this as the carrier. The second piece of iron is known as the caliper head or caliper body. It contains the mechanical components that receive actuation from an actuating mechanism (i.e. air chamber), and then converts the force from the actuator into mechanical leverage that operates pistons or threaded tappets. Those pistons or tappets then advance to create brake torque. No brake torque or clamping force can be created unless the caliper head can be pulled into the carrier in such a manner as to create the clamping force necessary for the brake pads to clamp the brake disc and retard the vehicle motion. To affect this free motion between the caliper head and carrier, original equipment manufacturers have designed the caliper with a guide pin assembly (sometimes also referred to as a slide pin or slide pin assembly). This assembly consists generally of one or more bushings that fit inside a bore on the caliper head. These bushings may be made of bronze, brass or steel and may or may not be dimpled. A lubricated steel guide pin is then inserted into the bushing. This guide pin is then bolted into the carrier, attaching the carrier to the caliper head, and providing a mechanism for lateral travel from which clamping force can be derived. Between the carrier and the caliper head is a rubber boot that seals the guide pin assembly on one end. At the back end of the caliper is a metal sealing cap that is pressed into the caliper to seal the guide pin assembly. All major manufacturers of calipers use this same process for the guide pin or slide pin assembly. In all cases, their design is defective and such defect results in extremely high maintenance costs for commercial vehicle fleets, and potential catastrophic brake failure for individual vehicles. The cause of this failure is that original equipment (OE) manufacturers have engineered calipers so that they cannot be regularly lubricated and maintained in such a manner as to extend the life of the guide pin assembly. As a result, the high-performance caliper will operate at temperatures exceeding 1,500 degrees Fahrenheit, and will constantly endure torque loads of more than 15,000 lb-ft. The combination of this high temperature and high torque causes the grease in the guide pin mechanism to literally evaporate, thus ceasing lubrication between the caliper head and carrier. Because there is no mechanism to service the unit (short of a complete replacement of the guide pin assemblies), the caliper continues to deteriorate until it seizes and creates exceptionally high costs of replacement, or catastrophic brake failure.

It is therefore an objective of the present invention to provide a caliper guide pin assembly which allows more lubrication to be delivered to the guide pin and bushing of a caliper head and allows the guide pin and bushing to be continually serviced on an ongoing basis therefore improving the fatigue life of the caliper. The present invention includes a guide pin with a plurality of channels at the lateral portion which allow a greater volume of lubrication to be introduced into the guide pin assembly on first application thereby increasing assembly life and decreasing fatigue. The present invention also includes a lubrication directional plug and a sealing end cap. The lubrication directional plug directs the lubrication through the guide pin assembly. The sealing end cap includes a grease valve to prevent over-lubrication of the guide pin assembly and zerk fitting allowing guide pin assembly to receive lubrication.

DETAIL DESCRIPTIONS OF THE INVENTION

All illustrations of the drawings are for the purpose of describing selected versions of the present invention and are not intended to limit the scope of the present invention.

The present invention generally relates to brake systems for an automotive vehicle. Specifically, the present invention pertains to air disk brake and internal lubrication thereof. The present invention is a caliper guide pin assembly which is capable of being continually serviced on an ongoing basis for increased product longevity. The present invention prevents costly maintenance and potential catastrophic brake failure due to a lack of guide pin lubrication. The present invention is designed as an aftermarket kit for air disk brakes but could be added to OE manufactured parts as an OE offering.

Figure 2:
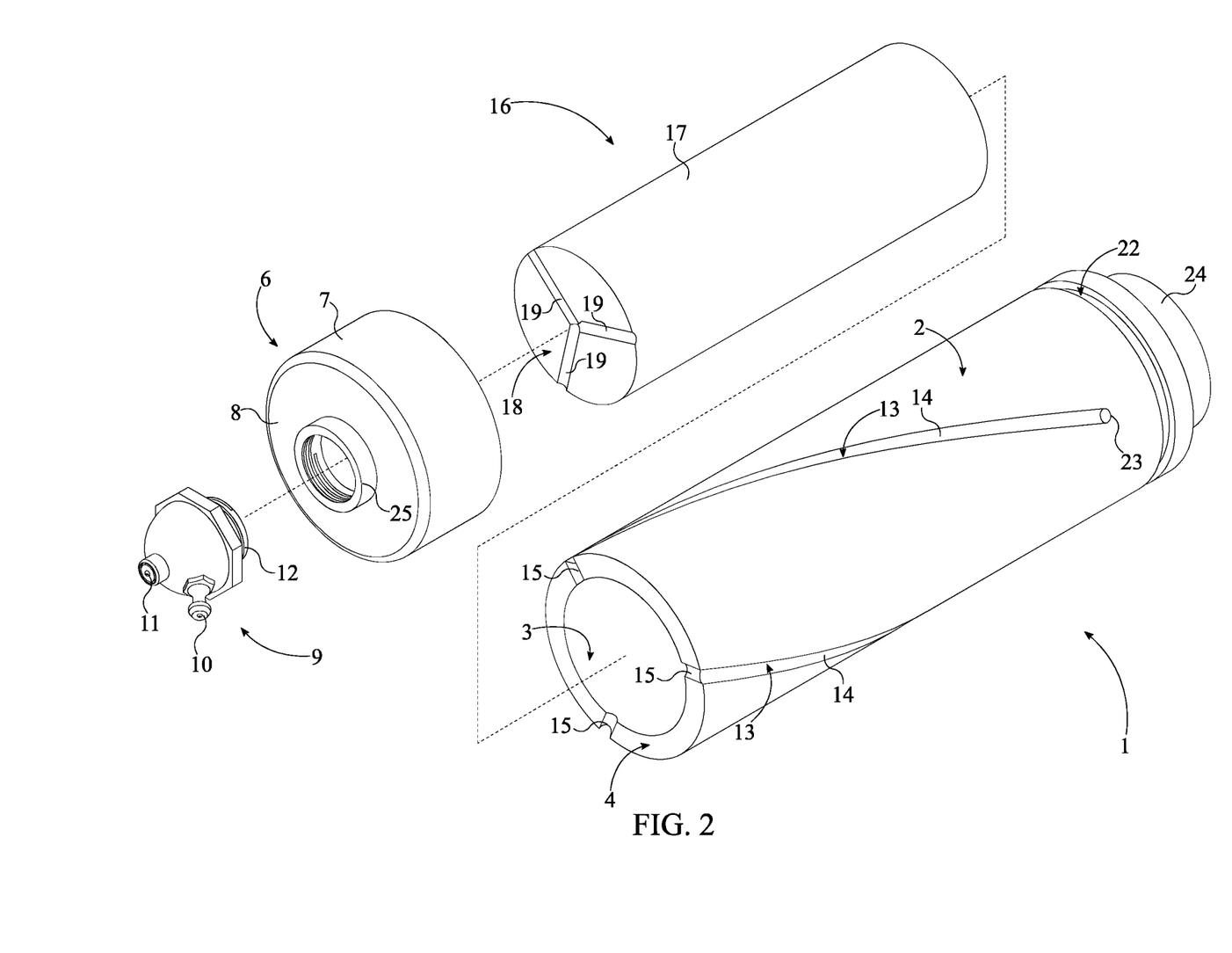
FIG. 2 is a perspective view of the present invention in an exploded state.

Referring to FIG. 2, in its simplest embodiment, the present invention comprises a tubular guide pin 1, a cap 6, a grease valve 9, and a plurality of lubricating grooves 13. The tubular guide pin 1 acts as the guide pin, or also known as a slide pin, which acts as a track for a caliper head in the air disk brake assembly. The tubular guide pin 1 allows for the caliper head to translate towards and away from a carrier of the air disk brake assembly, similar to traditional guide pins. The size, material composition, and design of the tubular guide pin 1 is subject to change to fit a variety of air disk brake assemblies. The plurality of lubricating grooves 13 is one of the main novel features of the present invention. Each of the plurality of lubricating grooves 13 provides a means of applying/dispersing grease to the interface surfaces between the tubular guide pin 1 and a receiving bore of the carrier. In particular, the interface surfaces include an external surface 2 of the tubular guide pin 1 and the internal surface of the receiving bore or bushings of the caliper head. In order to ensure total coverage of the interface surfaces, the plurality of lubricating grooves 13 is radially distributed about the tubular guide pin 1; wherein, each of the plurality of lubricating grooves 13 normally traverses into the tubular guide pin 1 from the external surface 2 of the tubular guide pin 1. Thus, any grease introduced to the plurality of lubricating grooves 13 will disperse and cover all the interface surfaces. The grease is introduced to the plurality of lubricating grooves 13 through a front surface 4 of the tubular guide pin 1. In particular, each of the plurality of lubricating grooves 13 traverses into the tubular guide pin 1 from the front surface 4 of the tubular guide pin 1. The grease within the system is retained and sealed off by the cap 6. The cap 6 is concentrically positioned with the tubular guide pin 1. Additionally, the cap 6 is positioned about the tubular guide pin 1, adjacent to the front surface 4 of the tubular guide pin 1, in order to form a liquid seal at the front surface 4 of the tubular guide pin 1.

Figure 6:
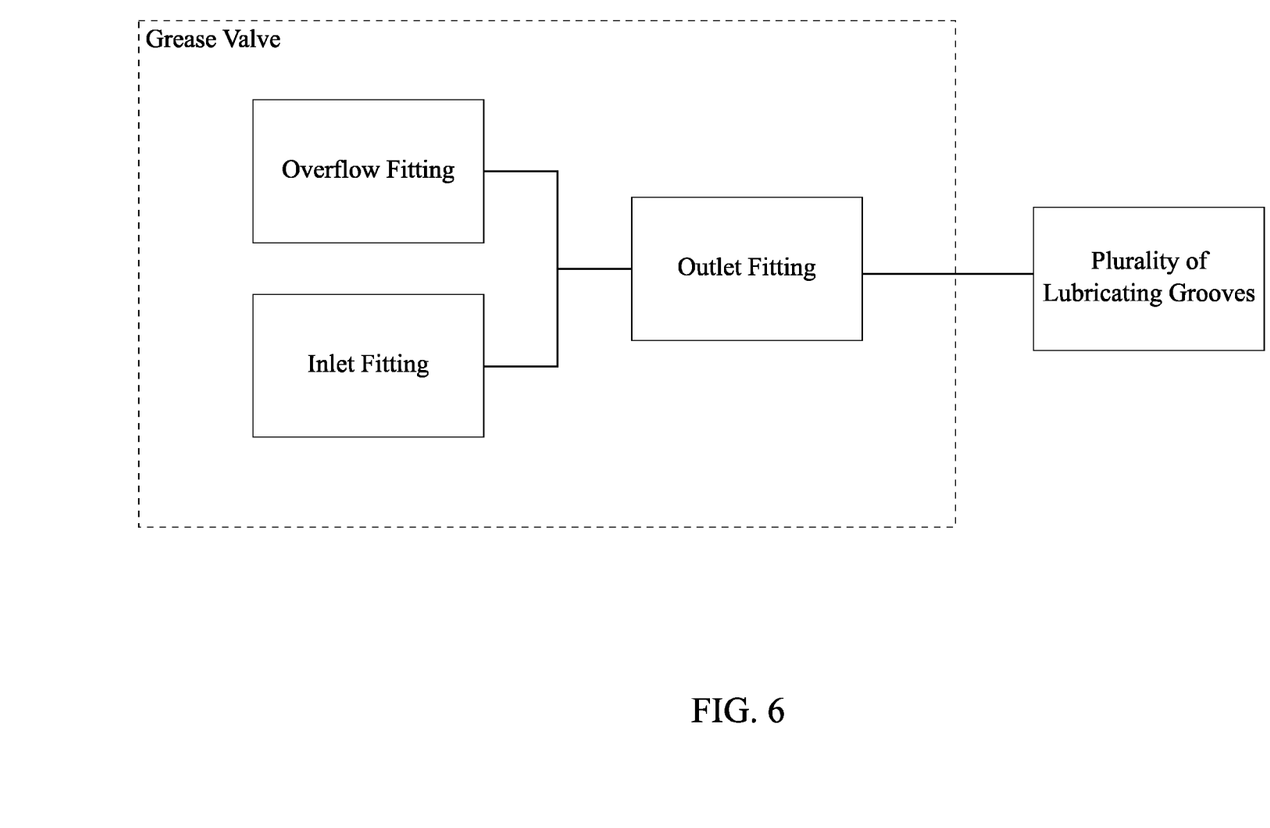
FIG. 6 is a fluid dynamic schematic of the present invention.

The front surface 4 of the tubular guide pin 1 receives the grease through the grease valve 9. The grease valve 9 is a hydraulic valve that receives, regulates, and distributes grease into the present invention. A variety of different types of hydraulic valves may be used as the grease valve 9. In particular, the grease valve 9 is positioned adjacent to the cap 6, opposite the tubular guide pin 1, to allow for grease injection without full deconstruction and maintenance of the caliper. The grease valve 9 is adjacently integrated into the cap 6 in order to establish a fluid connection between an external environment and the interior of the cap 6, i.e. the front surface 4 of the tubular guide pin 1. Resultantly, the grease valve 9 is fluid communication with each of the plurality of lubricating grooves 13 as seen in FIG. 6.

Figure 1:
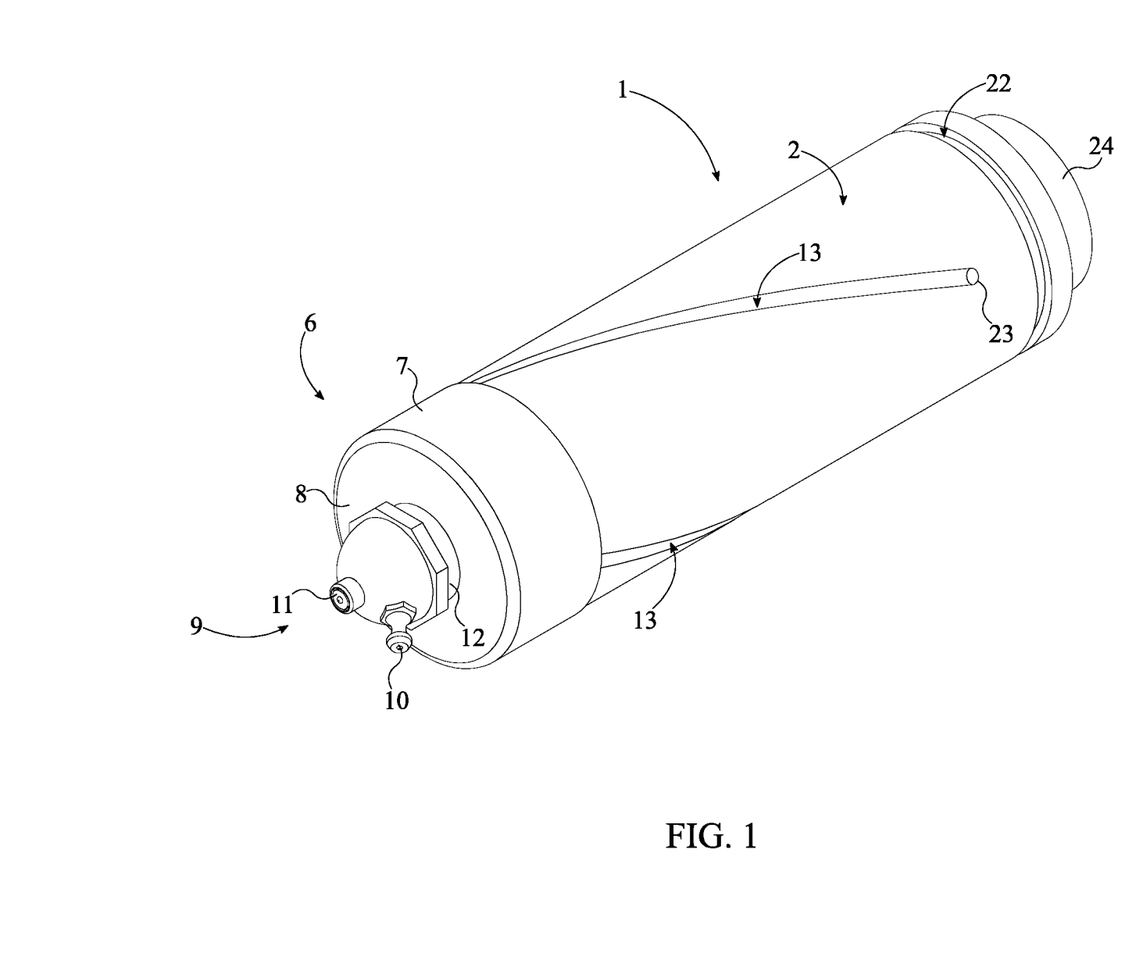
FIG. 1 is a perspective view of the present invention.

Referring to FIG. 1 and FIG. 2, it is preferred that each of the plurality of lubricating grooves 13 is curved for maximum grease penetration. In particular, each of the plurality of lubricating grooves 13 comprises a curved portion 14 and a guide portion 15. The curved portion 14 is an elongated narrow cut or depression that is positioned extending along the tubular guide pin 1. Additionally, the elongated narrow cut curves along a semi-helical (a semi-circular) path with a central axis being the central axis of the tubular guide pin 1. This ensures that all portions of the external surface 2 of the tubular guide pin 1 is covered in grease. The guide portion 15 is a small cut or depression in the front surface 4 of the tubular guide pin 1 that receives grease and directs said grease towards the curved portion 14. More specifically, the guide portion 15 is positioned adjacent to the front surface 4 of the tubular guide pin 1 and extends from an internal surface 3 of the tubular guide pin 1 to the external surface 2 of the tubular guide pin 1. Additionally, the guide portion 15 is positioned adjacent to the curved portion 14 in order to put the guide portion 15 in fluid communication with the curved portion 14. The length, size, cross-section, number of, and positioning of the plurality of lubricating grooves 13 is subject to change to meet the needs and requirements of different brake assemblies as well as the needs of the user. In the preferred embodiment of the present invention, a cross-section of each of the plurality of lubricating grooves 13 is preferably semi-circular shaped.

Figure 3:
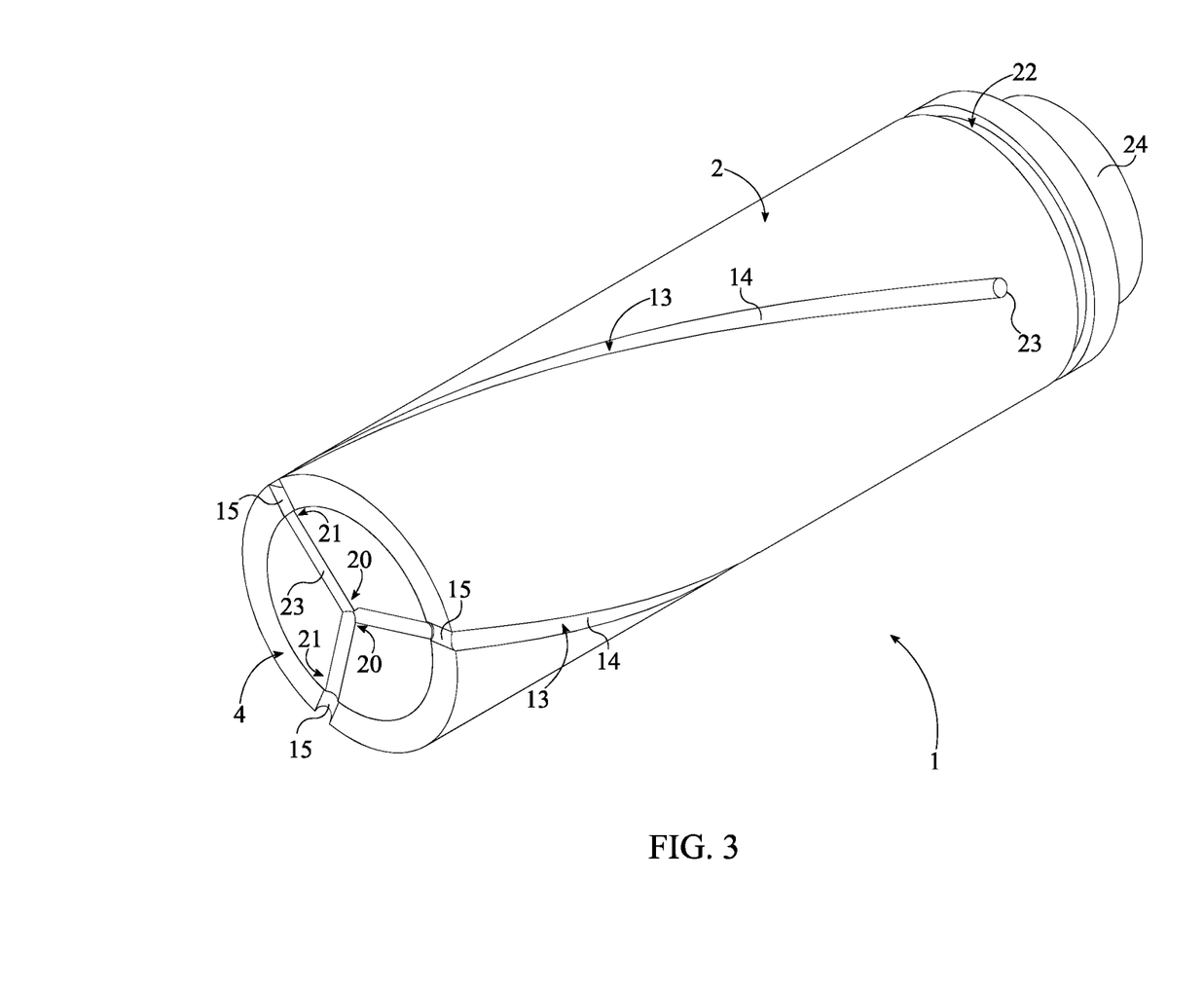
FIG. 3 is a perspective view of an enlarged tubular guide pin and a lubrication directional plug of the present invention.

Referring to FIG. 3, similar to traditional designs, the cap 6 comprises a tubular portion 7 and a disk portion 8. The tubular portion 7 is an elongated tube sized to complimentary fit over the tubular guide pin 1 to attach the cap 6 to the tubular guide pin 1. More specifically, the tubular portion 7 is concentrically positioned about the tubular guide pin 1, adjacent to the front surface 4 of the tubular guide pin 1. The disk portion 8 is a thin circular structure which closes off the tubular portion 7 and, thus, the tubular guide pin 1. The disk portion 8 is concentrically positioned with the tubular portion 7. Additionally, the disk portion 8 is terminally and perimetrically connected to the tubular portion 7.

Figure 7:
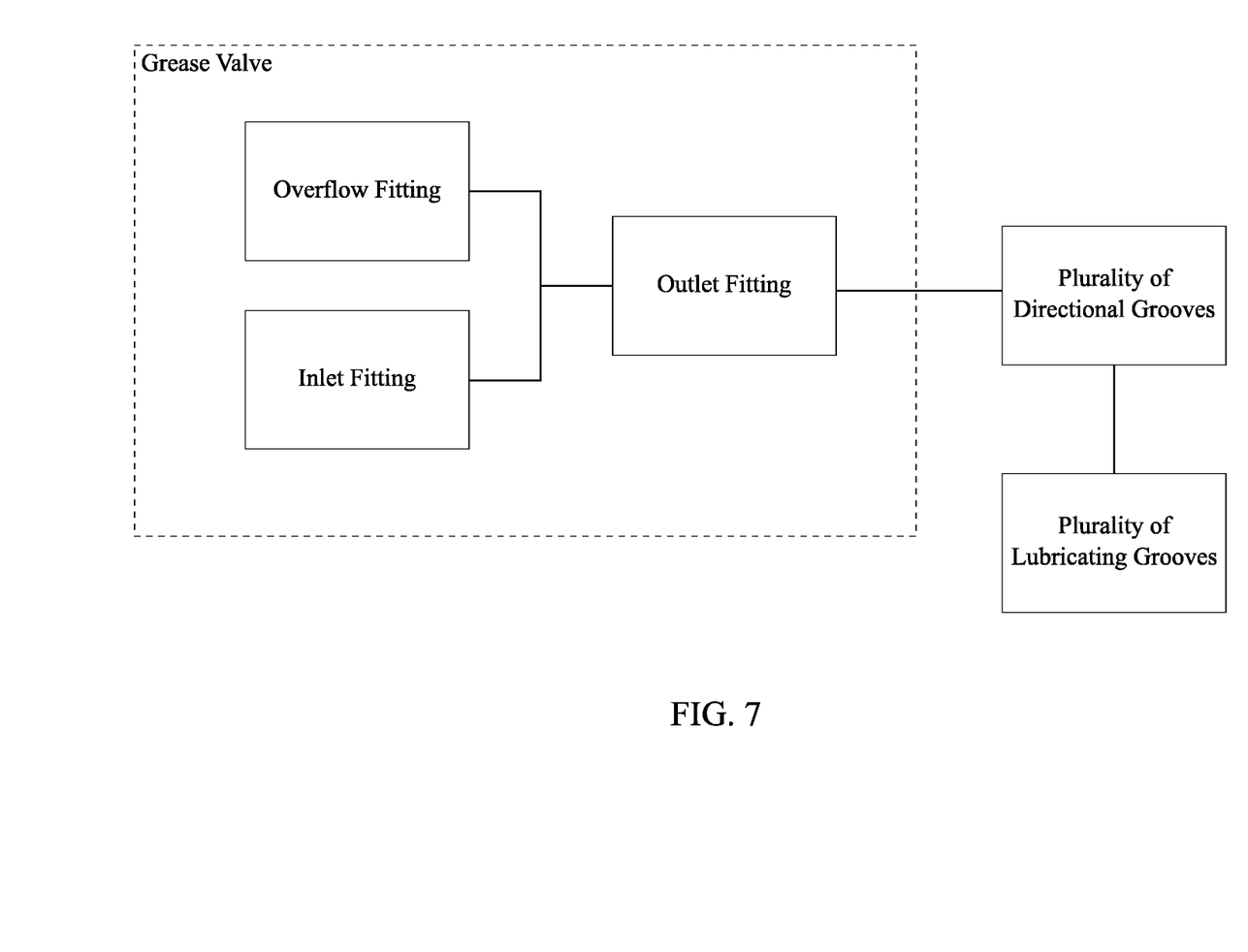
FIG. 7 is a fluid dynamic schematic of an alternative embodiment of the present invention.

Referring to FIG. 7, the lubrication directional plug 16 fills the internal space of the tubular guide pin 1, thus forcing any grease introduced through the grease valve 9 to be redirected to the plurality of lubricating grooves 13. Referring to FIG. 2, the lubrication directional plug 16 comprises a cylindrical body 17 and a plurality of directional grooves 19. The cylindrical body 17 is complimentary sized to the internal space of the tubular guide pin 1. The cylindrical body 17 is concentrically positioned within the tubular guide pin 1 with a front surface 18 of the cylindrical body 17 being positioned coplanar with the front surface 4 of the tubular guide pin 1. Thus, the front surface 18 of the cylindrical body 17 receives the grease being injected through the grease valve 9. The plurality of directional grooves 19 receives the injected grease and redirects it to plurality of lubricating grooves 13. In particular, the plurality of directional grooves 19 is radially distributed about the cylindrical body 17; wherein each of the plurality of directional grooves 19 normally traverses into the front surface 18 of the cylindrical body 17. For efficient flow of grease, each of the plurality of directional grooves 19 is in fluid communication with a corresponding groove from the plurality of lubricating grooves 13. In an alternative embodiment, the lubrication directional plug 16 comprises only the cylindrical body 17 as any grease entering through the grease valve 9 will still leak towards the plurality of lubricating grooves 13.

The number within the plurality of directional grooves 19 preferably matches the number within the plurality of lubricating grooves 13. Additionally, the size, geometry, and design of each of the plurality of directional grooves 19 matches the size, geometry, and design of each of the plurality of lubricating grooves 13. This ensures a smooth fluid flow between the plurality of directional grooves 19 and the plurality of lubricating grooves 13. More specifically, a cross-section for each of the plurality of directional grooves 19 is semi-circular shaped. Furthermore, in the preferred embodiment of the present invention, a first end 20 of each of the plurality of directional grooves 19 is positioned coincident with each other, at the center of the front surface 18 of the cylindrical body 17. The center of the front surface 18 of the cylindrical body 17 coincides with an output of the grease valve 9; and resultantly, the first end 20 of each of the plurality of directional grooves 19 receives the grease entered into the system through the grease valve 9. A second end 21 of each of the plurality of directional grooves 19 is positioned adjacent with a corresponding groove from the plurality of lubricating grooves 13 to establish a fluid communication.

Figure 5:
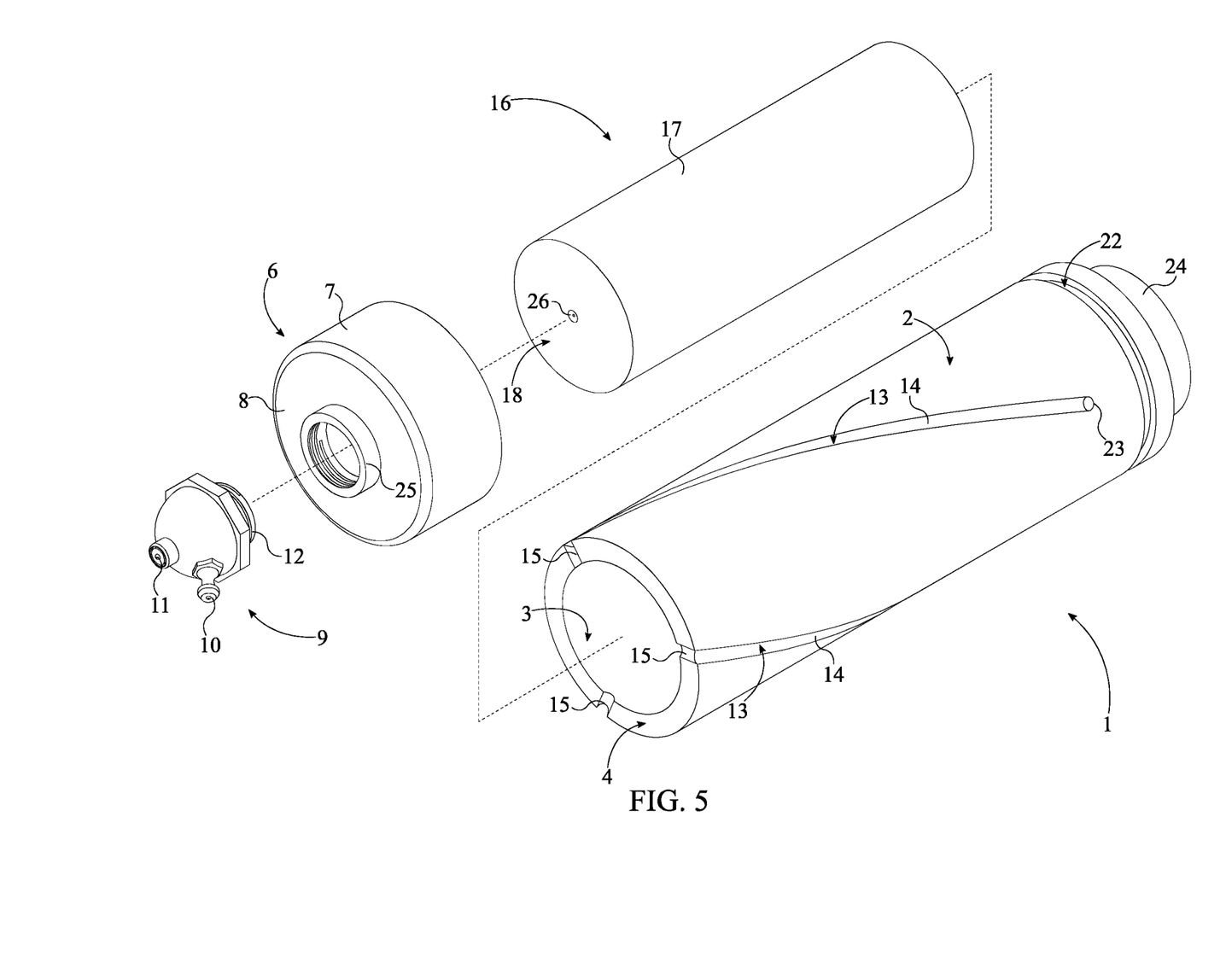
FIG. 5 is a perspective view of an alternative embodiment of the present invention in an exploded state.

Referring to FIG. 5, in one embodiment of the present invention, the lubrication directional plug 16 comprises the cylindrical body 17 and a removal hole 26. In this embodiment, the front surface 18 of the cylindrical body 17 redirects grease towards the plurality of lubricating grooves 13. The cylindrical body 17 is concentrically positioned within the tubular guide pin 1 with the front surface 18 of the cylindrical body 17 being positioned coplanar with the front surface 4 of the tubular guide pin 1. The removal hole 26 provides a means of removing the cylindrical body 17 from the tubular guide pin 1. More specifically, the removal hole 26 concentrically traverses into the front surface 18 of the cylindrical body 17 such that a pick may be inserted into the removal hole 26 and pull the lubrication directional plug 16 out of the tubular guide pin 1.

Figure 4:
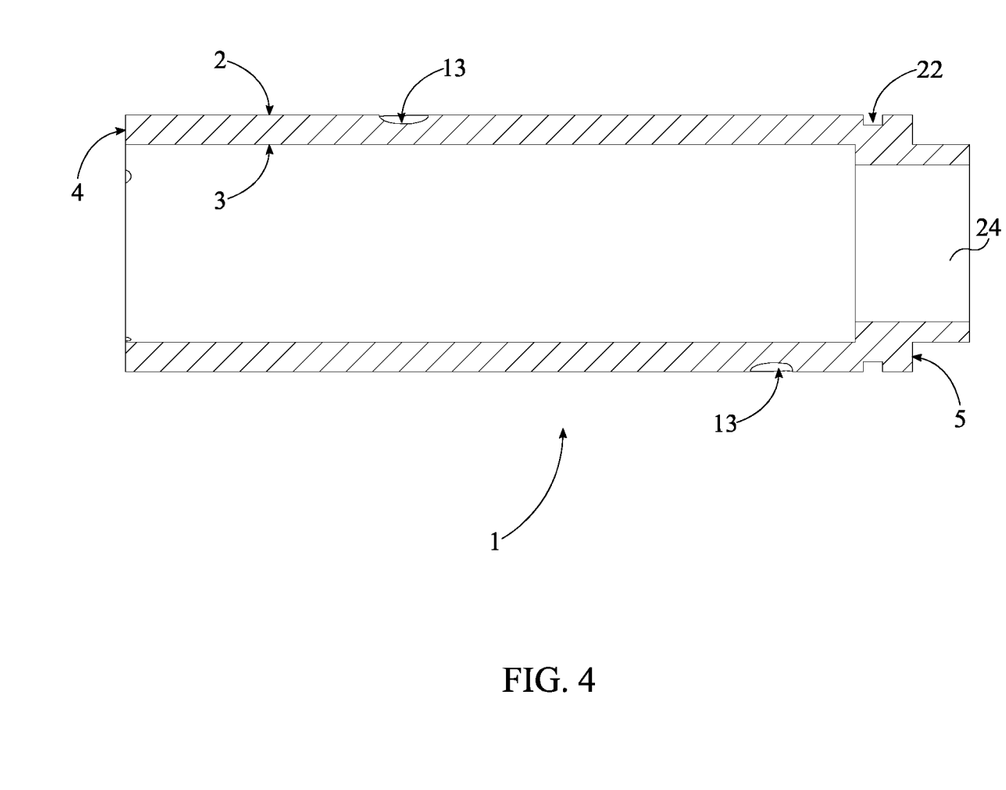
FIG. 4 is a cross-sectional view of the tubular guide pin.

Referring to FIG. 3 and FIG. 4, for mounting and installment purposes, the present invention comprises an annular groove 22 and a mounting tube 24. The annular groove 22 is positioned adjacent to a rear surface 5 of the tubular guide pin 1. Additionally, the annular groove 22 laterally traverses into the tubular guide pin 1 from the external surface 2 of the tubular guide pin 1. In order to prevent over greasing and possibly hydro-locking the assembly, a grease dam is used. The grease dam prevents grease from filling any portions besides the interface surfaces. More specifically, the grease dam is formed by positioning a distal end 23 of each of the plurality of lubricating grooves 13 offset from the annular groove 22, thus creating a physical barrier. The grease dam limits the amount of grease allowed in the system. Once grease reaches the grease dam of each of the plurality of lubricating grooves 13, back pressure is created which causes the grease valve 9 to cease lubrication. The offset distance between the distal end 23 of each of the plurality of lubricating grooves 13 and the annular groove 22 is subject to change to meet various performance and lubrication needs. The mounting tube 24 allows the tubular guide pin 1 to be fastened to the carrier. The mounting tube 24 is positioned adjacent to the rear surface 5 of the tubular guide pin 1 and is concentrically positioned within the tubular guide pin 1. More specifically, a first portion of the mounting tube 24 is positioned within the tubular guide pin 1 and a second portion of the mounting tube 24 is externally positioned to the tubular guide pin 1. The mounting tube 24 is laterally and perimetrically connected to the tubular guide pin 1. The first portion acts as an interlocking component by fitting in a corresponding bore of the carrier head. This anchors the mounting tube 24 to the carrier head in terms of lateral movement. The second portion acts as a flange for a fastening bolt. The fastening bolt traverses through the mounting tube 24 with a head portion pressing against the second portion and the threaded portion of the fastening bolt being engaged to the carrier head. Resultantly, the present invention is secured to the carrier head.

In alternative embodiments of the present invention, other mounting and installment means, components, and methods may be utilized depending on the type of caliper, manufacturing methods, vehicle type/brand, and other similar factors. For alternative means, one particular characteristic is consistent, the grease dam. In general, the distal end 23 of each of the plurality of lubricating grooves 13 is positioned offset from the rear surface 5 of the tubular guide pin 1.

Referring to FIG. 2, in the preferred embodiment of the present invention, the grease valve 9 is a hydraulic shut-off valve and comprises an input fitting 10, an overflow fitting 11, and an output fitting 12. The input fitting 10 is a mechanical device that allows for the flow of fluid in one direction. Thus, the input fitting 10 receives the grease through a hand-grease gun, or any other device with similar capabilities. The overflow fitting 11 is a pop-up valve for the overall system that ensures that the grease within the system is under a specific pressure, therefore regulating the amount of grease within the present invention. If at one point, the internal pressure of the system surpasses the specific pressure, the overflow fitting 11 is activated and grease is released through the overflow fitting 11 automatically. The present invention further comprises a valve-receiving coupler 25 for attaching the grease valve 9 to the cap 6. The valve-receiving coupler 25 is concentrically integrated into the disk portion 8. More specifically, the valve-receiving coupler 25 comprises a valve hole and a coupling tube. The valve hole traverses through the disk portion 8 and the coupling tube is concentrically positioned with the valve hole, adjacently connected to the disk portion 8. The valve-receiving coupler 25 is internally threaded to interlock with the grease valve 9; specifically, the coupling tube is internally threaded. The output fitting 12 is threadably attached within the valve-receiving coupler 25. The input fitting 10 and the overflow fitting 11 are adjacently connected to the output fitting 12, opposite the cap 6. Additionally, for fluid management, the input fitting 10, the overflow fitting 11, and the output fitting 12 are in fluid communication with each other.

Although the invention has been explained in relation to its preferred embodiment, it is to be understood that many other possible modifications and variations can be made without departing from the spirit and scope of the invention as hereinafter claimed.

What is claimed is:

1. A caliper guide pin assembly comprises:
   a tubular guide pin;
   a cap;
   a grease valve;
   a plurality of lubricating grooves;
   the plurality of lubricating grooves being radially distributed about the tubular guide pin;
   each of the plurality of lubricating grooves normally traversing into the tubular guide pin from an external surface of the tubular guide pin;
   each of the plurality of lubricating grooves traversing into the tubular guide pin from a front surface of the tubular guide pin;
   the cap being concentrically positioned with the tubular guide pin;
   the cap being positioned about the tubular guide pin, adjacent to the front surface of the tubular guide pin;
   the grease valve being positioned adjacent to the cap, opposite to the tubular guide pin;
   the grease valve being adjacently integrated into the cap; and
   the grease valve being in fluid communication with each of the plurality of lubricating grooves.

2. The caliper guide pin assembly as claimed in claim 1 comprises:
   each of the plurality of lubricating grooves comprises a curved portion and a guide portion;
   each curved portion being positioned extending along the tubular guide pin;
   each guide portion being positioned adjacent to the front surface of the tubular guide pin;
   each guide portion extending from an internal surface of the tubular guide pin to the external surface of the tubular guide pin; and
   each guide portion being positioned adjacent to each curved portion.

3. The caliper guide pin assembly as claimed in claim 1 comprises:
   the cap comprises a tubular portion and a disk portion;
   the disk portion being concentrically positioned with the tubular portion;
   the disk portion being terminally and perimetrically connected to the tubular portion;

the tubular portion being concentrically positioned about the tubular guide pin; and the disk portion being positioned parallel and adjacent to the front of the tubular guide pin.

4. The caliper guide pin assembly as claimed in claim 1 comprises:

a lubrication directional plug;

the lubrication directional plug comprises a cylindrical body and a plurality of directional grooves;

the plurality of directional grooves being radially distributed about the cylindrical body;

each of the plurality of directional grooves normally traversing into a front surface of the cylindrical body;

the cylindrical body being concentrically positioned within the tubular guide pin;

the front surface of the cylindrical body being positioned coplanar with the front surface of the tubular guide pin; and each of the plurality of directional grooves being in fluid communication with a corresponding groove from the plurality of lubricating grooves.

5. The caliper guide pin assembly as claimed in claim 4 comprises:

a first end of each of the plurality of directional grooves being coincident with each other; and a second end of each of the plurality of directional grooves being positioned adjacent with the corresponding groove from the plurality of lubricating grooves.

6. The caliper guide pin assembly as claimed in claim 1 comprises:

an annular groove;

the annular groove being positioned adjacent to a rear surface of the tubular guide pin;

the annular groove laterally traversing into the tubular guide pin from the external surface of the tubular guide pin; and a distal end of each of the plurality of lubricating grooves being positioned offset from the annular groove.

7. The caliper guide pin assembly as claimed in claim 1 comprises:

a mounting tube;

the mounting tube being positioned adjacent to a rear surface of the tubular guide pin;

the mounting tube being concentrically positioned within the tubular guide pin; and the mounting tube being laterally and perimetrically connected to the tubular guide pin.

8. The caliper guide pin assembly as claimed in claim 1 comprises:

a valve-receiving coupler;

the grease valve comprises an input fitting, an overflow fitting, and an output fitting;

the valve-receiving coupler concentrically integrated into a disk portion of the cap;

the output fitting being threadably attached within the valve-receiving coupler;

the input fitting and the overflow fitting being adjacently connected to the output fitting, opposite the cap; and the input fitting, the overflow fitting, and the output fitting being in fluid communication with each other.

9. The caliper guide pin assembly as claimed in claim 1 comprises:

a lubrication directional plug;

the lubrication directional plug comprises a cylindrical body and a removal hole;

the removal hole concentrically traversing into a front surface of the cylindrical body;

the cylindrical body being concentrically positioned within the tubular guide pin; and the front surface of the cylindrical body being positioned coplanar with the front surface of the tubular guide pin.

10. A caliper guide pin assembly comprises:

a tubular guide pin;

a cap;

a grease valve;

a plurality of lubricating grooves;

the plurality of lubricating grooves being radially distributed about the tubular guide pin;

each of the plurality of lubricating grooves normally traversing into the tubular guide pin from an external surface of the tubular guide pin;

each of the plurality of lubricating grooves traversing into the tubular guide pin from a front surface of the tubular guide pin;

the cap being concentrically positioned with the tubular guide pin;

the cap being positioned about the tubular guide pin, adjacent to the front surface of the tubular guide pin;

the grease valve being positioned adjacent to the cap, opposite to the tubular guide pin;

the grease valve being adjacently integrated into the cap;

the grease valve being in fluid communication with each of the plurality of lubricating grooves;

each of the plurality of lubricating grooves comprises a curved portion and a guide portion;

each curved portion being positioned extending along the tubular guide pin;

each guide portion being positioned adjacent to the front surface of the tubular guide pin;

each guide portion extending from an internal surface of the tubular guide pin to the external surface of the tubular guide pin; and each guide portion being positioned adjacent to each curved portion.

11. The caliper guide pin assembly as claimed in claim 10 comprises:

the cap comprises a tubular portion and a disk portion;

the disk portion being concentrically positioned with the tubular portion;

the disk portion being terminally and perimetrically connected to the tubular portion;

the tubular portion being concentrically positioned about the tubular guide pin; and the disk portion being positioned parallel and adjacent to the front of the tubular guide pin.

12. The caliper guide pin assembly as claimed in claim 10 comprises:

a lubrication directional plug;

the lubrication directional plug comprises a cylindrical body and a plurality of directional grooves;

the plurality of directional grooves being radially distributed about the cylindrical body;

each of the plurality of directional grooves normally traversing into a front surface of the cylindrical body;

the cylindrical body being concentrically positioned within the tubular guide pin;

the front surface of the cylindrical body being positioned coplanar with the front surface of the tubular guide pin; and each of the plurality of directional grooves being in fluid communication with a corresponding groove from the plurality of lubricating grooves.

13. The caliper guide pin assembly as claimed in claim 12 comprises:

a first end of each of the plurality of directional grooves being coincident with each other; and a second end of each of the plurality of directional grooves being positioned adjacent with the corresponding groove from the plurality of lubricating grooves.

14. The caliper guide pin assembly as claimed in claim 10 comprises:

an annular groove;

the annular groove being positioned adjacent to a rear surface of the tubular guide pin;

the annular groove laterally traversing into the tubular guide pin from the external surface of the tubular guide pin; and a distal end of each of the plurality of lubricating grooves being positioned offset from the annular groove.

15. The caliper guide pin assembly as claimed in claim 10 comprises:

a mounting tube;

the mounting tube being positioned adjacent to a rear surface of the tubular guide pin;

the mounting tube being concentrically positioned within the tubular guide pin; and the mounting tube being laterally and perimetrically connected to the tubular guide pin.

16. The caliper guide pin assembly as claimed in claim 10 comprises:

a valve-receiving coupler;

the grease valve comprises an input fitting, an overflow fitting, and an output fitting;

the valve-receiving coupler concentrically integrated into a disk portion of the cap;

the output fitting being threadably attached within the valve-receiving coupler;

the input fitting and the overflow fitting being adjacently connected to the output fitting, opposite the cap; and the input fitting, the overflow fitting, and the output fitting being in fluid communication with each other.

17. The caliper guide pin assembly as claimed in claim 10 comprises:

a lubrication directional plug;

the lubrication directional plug comprises a cylindrical body and a removal hole;

the removal hole concentrically traversing into a front surface of the cylindrical body;

the cylindrical body being concentrically positioned within the tubular guide pin; and the front surface of the cylindrical body being positioned coplanar with the front surface of the tubular guide pin.

* * * * *